United States Patent [19]
Roth et al.

[11] Patent Number: 5,878,422
[45] Date of Patent: Mar. 2, 1999

[54] SYSTEM FOR VIRTUALLY CONVERTING DATA IN A FIELD BETWEEN FIRST AND SECOND FORMAT BY USING HOOK ROUTINES

[75] Inventors: Yehuda Roth, Karnei Shomron; Ossi Launer, Petach Tikva, both of Israel

[73] Assignee: Viasoft, Inc., Phoenix, Ariz.

[21] Appl. No.: 833,763

[22] Filed: Apr. 9, 1997

Related U.S. Application Data

[63] Continuation-in-part of Ser. No. 629,604, Apr. 9, 1996, abandoned.

[51] Int. Cl.$^6$ ....................................................... G06F 17/30
[52] U.S. Cl. .................................. 707/100; 707/1; 707/6; 707/101; 707/102; 395/701
[58] Field of Search ..................................... 395/710, 701; 707/1–6, 100–103, 104

[56] References Cited

U.S. PATENT DOCUMENTS

| | | | |
|---|---|---|---|
| 5,600,836 | 2/1997 | Alter | 395/612 |
| 5,630,118 | 5/1997 | Shaughnessy | 395/601 |
| 5,680,622 | 10/1997 | Even | 395/709 |

OTHER PUBLICATIONS

"A Scaelable, Automated Process for Year 2000 System Correction," John M. Hart et al., Peritus Software, Inc. Proceedings of the 1996 18th International Conference on Software Engineering, Berlin, Germany, Feb. 25, 1996, pp. 475–484, IEEE.

"Date Logic Generator: TransCentury Data Systems untangles Spaghetti Code", Pearkins, Enterprize Systems Journal, v11, N.5, p7(1), available at: http://dialog.krinfo.com, Dialog File 275. May 1996.

"DateServer 2000", Robert Chris, Enterprise Systems Journal, v9, N11, p10(1), DIALOG File 275 01806334. Nov. 1994.

"DOOMSDAY", Peter de Jagar, Computer World. Sep. 1993.

"DateServer 2000 –The Nutti–Century Solution", http://www.year2000.com. Jan. 1994.

"The Year 2000 and 2–digit Dates: A Guide for Planning and Implementation", IMB 4th ed. GC28–1251–03. Jan. 1995.

Primary Examiner—Thomas G. Black
Assistant Examiner—Hosain T. Alam
Attorney, Agent, or Firm—Michael A. Lechter; James H. Phillips

[57] ABSTRACT

The present invention provides a novel solution to the problem the quickly approaching turn of the century will have on software systems that were not designed to handle dates beyond the year 2000. The present invention is also applicable to any software application where it is desired to virtually change the formatting of any arbitrary item of data. The item of data can come from any type of data source such as data files or computer screen memory. The present invention operates by severing the link between the program conversion process and the data file conversion process. The present invention assumes control each time a converted program reads or writes a record of a data file that has not yet been converted. Converting records during I/O operations, enables a converted program to access an unconverted data file as if it were converted. The invention converts the data fields in a read record to a new format that is implementation specific before passing it on to the program. In the converted program, the data is defined in the new format which the program expects to see. Unconverted programs continue to access the actual unconverted data file. Thus, the present invention provides the converted program with a virtual converted view of an unconverted data file. The invention similarly converts data having the desired format to data having the old format before writing records to an unconverted data file.

39 Claims, 11 Drawing Sheets

FIG. 1
PRIOR ART
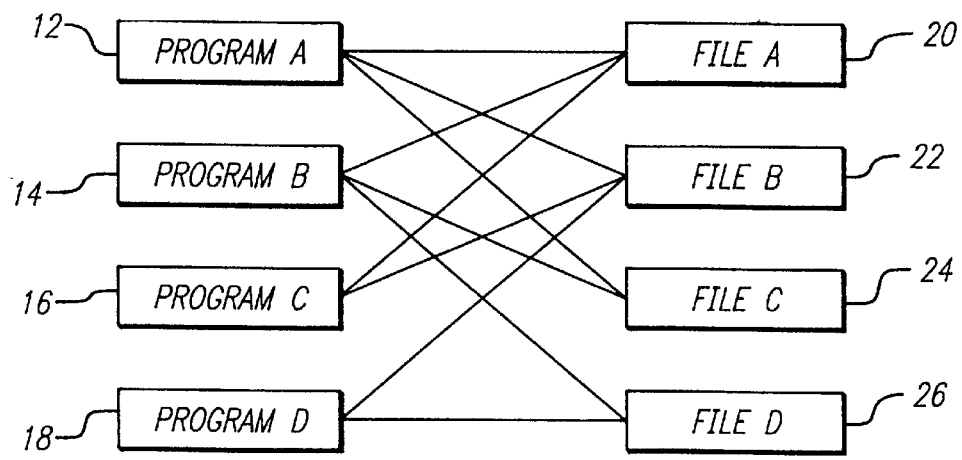
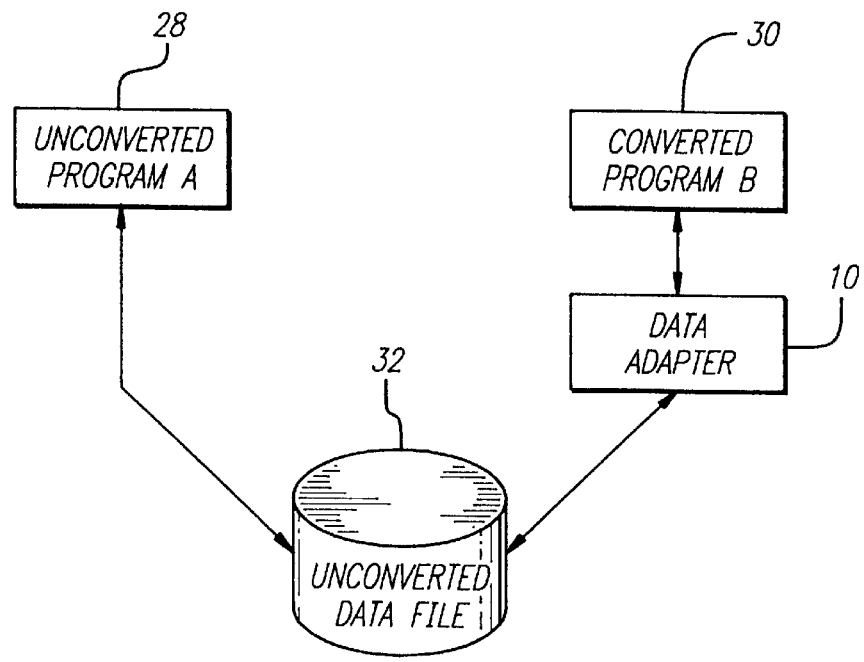
FIG. 2

```
FILE-ID BANKIN.

DEFAULTS
   CONVERT YES
   OUTPUT-FORMAT OLD.

WINDOW-YEAR 20.

RECORD-DEFS.
       COPY BANKIN.
END-RECORD-DEFS.

RECORD-TYPES
   BK-RECORD-TYPE.

TYPE BK-RECORD-TYPE VALUE '1' '2'.
   RECORD BK-BANK-MONITARY.
     YYMMDD-DATES
           BK-DATE-ACTION,
           BK-M-ID-DATE,
           BK-DATE-INTEREST.
END-TYPE.

TYPE BK-RECORD-TYPE VALUE 'O' 'G'.
   RECORD BK-BANK-HEADER.
     YYMMDD-DATES
           BK-DATE-MARKET,
           BK-CREATION-DATE.
END-TYPE.

TYPE BK-RECORD-TYPE VALUE '9'.
* No dates here
   RECORD BK-BANK-TOTAL.
END-TYPE.
```

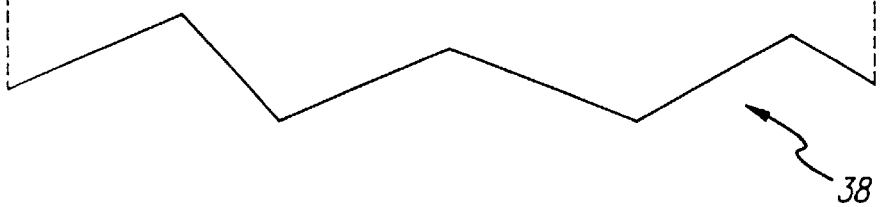

FIG. 11-1

```
TYPE BK-RECORD-TYPE VALUE '4'.
  RECORD BB-BANK-TOTAL.
    ARRAY BB-SUMS(12) DEPENDING ON BB-NO-OF-SUMS.
      YYMMDD-DATES
        BB-SUM-DATE.
      ARRAY BB-SUM-DETAILS(20).
        YYMMDD-DATES
          BB-DETAIL-DATE.
      END-ARRAY.
    END-ARRAY.
END-TYPE.

DEFAULT-TYPE.
  RECORD KK-BANK-COMMENT.
    YYMMDD-DATES
      KK-COMMENT-DATE,
      KK-COMMENT-MODIFY-DATE.
    YYDDD-DATES
      TIME-STAMP.
END-TYPE.

DATA DEFINITION FILE
```

SYSTEM FOR VIRTUALLY CONVERTING DATA IN A FIELD BETWEEN FIRST AND SECOND FORMAT BY USING HOOK ROUTINES

This is a continuation in part of application Ser. No. 08/629,604 filed Apr. 9, 1996, now abandoned.

FIELD OF THE INVENTION

The present invention relates to software systems and in particular to software systems for virtualizing arbitrary data within software system program and data files to any desired format.

BACKGROUND OF THE INVENTION

The Information Technology (IT) industry currently faces a huge problem as the year 2000 approaches. The problem is that programs and applications that represent dates using only two digits (i.e. '96' rather than 1996) to represent the year will break down when they try to perform arithmetic operations, comparisons, or sorting of dates that lie beyond the year 2000. Incorrect results will be obtained when programs try to process dates that lie outside the range of Jan. 1, 1900 to Dec. 31, 1999. The scope of the year 2000 date change is very wide and includes both hardware and software from microcode on up to application program code on both mainframes and desktop computers. It also includes both programs and database files and spans all computer platforms.

The year 2000 problem stems mostly from application programs and their corresponding data that use two digits to represent the year rather than four digits. A large number of these programs were written by application programmers back in the 1960's and 1970's who never expected that their software would still be used 20 or 30 years later in the year 2000. In addition, these programs were written at a time when every byte of storage memory space was valuable. Every opportunity to reduce the storage requirements of programs and databases was taken advantage of. As a result, two digit field to represent year data was widely used and quickly became the customary practice of the trade. Rather than being tossed out, as time passed, new features were added and updates made to these legacy applications, mostly written for mainframe and minicomputers, in order to keep them current.

The year 2000 problem is compounded when one considers the possible ramifications of using two digits to store the year. Any arithmetic calculation that subtracts year data runs the risk of being off when using years 2000 and beyond. Two-digit date information cannot be compared correctly if the dates are in different centuries. In addition, sorting algorithms will not sort correctly records that include years 2000 and beyond. For example, the year 2003, represented by 03, will be sorted before the year 1996, represented by 96. In addition, leap year and other day/week month calculations will be off. For example, the year 2000 is a leap year whereas 1900 is not. In addition, the dates of the week and month are not the same in, for example, the years 2001 and 1901.

Several solutions to this problem have already been proposed. One solution is to expand the date field so it stores a 4-digit year field. This appears to be the appropriate solution for making the software system year-2000 compliant. No change to the logic of the program is required, only obvious changes to date related portions. Although elegant, a disadvantage of this approach is that changing the data field length requires simultaneous conversion of both program and data files. All software programs that reference the converted data file must also be converted to handle the 4-digit year format. This is either impossible or extremely difficult to implement when considering that the typical data processing shop may have a combined number of modules and database files in the range of 15,000 to 30,000. Thus, the link between program and data files makes it necessary to build encapsulated clusters of programs and data files that can be converted and then implemented, independent of other programs and files in the system. Due to the interrelated nature of most systems, these clusters tend to become extremely large and may contain hundreds and hundreds of programs and data files.

Another solution is to use a windowing technique which externalizes the 2-digit year into a 4-digit representation. This technique uses a fixed or rolling window of 100 years to determine whether the 2-digit year is 19xx or 20xx. A number of years to be used for each century is specified. For example, numbers 00 to 20 might represent years 2000 to 2020. Thus the numbers 21 to 99 represent the years 1921 to 1999. An advantage of this technique is that there is no need to expand the 2-digit year to a 4-digit format. A disadvantage is that a problem exists if years beyond the 100 year range are needed. In addition, any databases that use the 2-digit year as an index will not work because of the discontinuous step from 20 to 21. And from 99 to 00.

A third solution is to encode and compress the 2-digit date field to hold 4-digits. An advantage of this solution is that there is no need to expand the 2-digit year data format to 4-digit year format. A disadvantage of this solution is that all programs that access this data file must be modified to handle the compressed/encoded 4-digit year format.

Illustrated in prior art FIG. 1 is a diagram showing the potential problems involved in using some of the prior art solutions discussed above. Depicting a small group of programs, Programs A 12, B 14, C 16 and D 18 are shown accessing one or more related data Files A 20, B 22, C 24 and D 26. Program A, for example, is shown with links to Files A, B and C. If Program A is converted to 4-digit year format, before it can be released into production, data Files A, B and C must also be converted, otherwise Program A will not work. Program B, however, accesses Files A, C and D, thus changing Program A also affects the operation of Program B. Therefore, it can be seen that in a typical scenario, the conversion of one program or data file cannot be done independently of other programs and/or data file, since they typically are interdependent among one another.

SUMMARY OF THE INVENTION

The present invention solves the problem inherent in the prior art solutions by providing a mechanism of virtualizing any arbitrary data field in a data file so as to be presented having any desired format. This mechanism is directly applicable to the year 2000 data problem described above. In particular, in the year 2000 context, the present invention operates by severing the link between the program conversion process and the data file conversion process. The present invention assumes control each time a converted program reads or writes a record of a data file that has not yet been converted. Converting records during I/O operations enables a converted program to access an unconverted data file as if it were converted. The invention converts the date fields in a read record to a new format that is implementation specific before passing it on to the program. In the converted program, the dates are defined in the new format (e.g. 4-digit year format) which the program expects to see. Unconverted programs continue to access the actual unconverted data file. Thus, the present invention provides the converted program with a virtual converted view of an unconverted data file. The invention similarly converts data having the new format, (e.g., 4-digit year format dates) to the old format before writing records to an unconverted data file.

Using the present invention, programs can now be converted and implemented in production before the files they use are converted. This enables program conversion and data file conversion to proceed independently of one another thus making planning and management much easier. Thus, small, compact clusters that contain programs only can be built. This allows more thorough testing of the conversion process. If a problem arises with a converted program, it is much easier to go back and use earlier versions of that particular program. In addition, using smaller segments, eliminates the need to tie up many programs for long periods of time. This reduces disruptions for the entire system. The chances of upsetting the daily work while transferring the converted programs to production is now significantly less than the case where large clusters of programs and data files are transferred. The present invention thus makes software conversion easier, cheaper, quicker and most importantly safer than solutions based on the prior art.

Accordingly, one aspect of the present invention provides a system of virtualizing any arbitrary data field of a data file as to be present in the data file in any desired format. In particular, legacy software applications may be adapted to the upcoming change in year from 1999 to 2000.

Another aspect of the present invention provides for a system of adapting legacy application programs to the year 2000 that only requires conversions to application programs and allows data files to remain intact with original 2-digit year format data.

It is yet another object of the present invention to eliminate the requirement that all application programs and data files be converted to a new, e.g., 4-digit year, format at once. Initially, application programs can be converted and subsequently data files may be converted.

Thus, there is provided in accordance with a preferred embodiment, a data adapting system for virtualizing an arbitrary data field, having an original format, of a data file so as to be present the data in a desired format. The system utilizes a data conversion definition suitably created by a user. The data conversion definition contains indicia of all record types in the data file; fields in the record type used to identify the record type, and their values, and data fields and their corresponding format, the data fields corresponding to the data to be virtualized and the corresponding format thereof. The system includes a conversion routine generator operative to generate a conversion routine utilizing the data conversion definition/ At least one conversion routine is provided to map displacements and offsets of the data fields within the records of the data file to the new format. A data adapter intercepts input/output (I/O) read requests from the program and, utilizing the conversion routine, substitutes in a record read from the data file, data having the desired format for data having the original format. The data adapter also intercepts I/O write requests from the program and, utilizing the conversion routine, substitute in a record written to the data file, data having the original format for data having the desired format. For example, the original data format may be a 2-digit year format and the desired data format maybe a 4-digit year format.

There is also provided, in accordance with a preferred embodiment a data adapting system for providing a program with virtual 4-digit year format date information derived from 2-digit year format stored in a data file, the system utilizing a data conversion definition created by a user containing all record types in the data file, fields in the record type used to identify the record type, including their values, and date fields and their corresponding format, the date fields corresponding to date information to be virtualized by the system, the system including a conversion routine generator operative to generate a conversion routine utilizing the data conversion definition, the conversion routine containing displacements and offsets of the date fields within the records of the data file, and a data adapter operative to intercept input/output (I/O) read requests from the program and, utilizing the conversion routine, substitute in a record read from the data file, 4-digit year format information for 2-digit year format information, the data adapter operative to intercept I/O write requests from the program and, utilizing the conversion routine, substitute in a record written to the data file, 2-digit year format information for 4-digit year format information.

If desired, the system may also include a program generator means for generating the conversion routine(s) utilizing the data conversion definition. In a preferred embodiment, program generator means includes a first (e.g., high level language) program generator, which utilizes the data conversion definition to generate a first (e.g., high level program, which high level program determines the mapping (e.g., displacements and offsets) of the data fields in the data file. A second program generator, the assembler program generator, processes the output of the high level program to generate the conversion routine.

In addition, there is also provided in accordance with a preferred embodiment of the present invention, a method of virtualizing an arbitrary item of data, having an original format, so as to be presented in a desired format, the method utilizing a data conversion definition created by a user, the data conversion definition containing all record types in the data file, fields in the record type used to identify the record type, including their values, and data fields and their corresponding format, the data fields corresponding to the data to be virtualized, the method including the steps of generating a conversion routine, utilizing the data conversion definition, the conversion routine containing displacements and offsets of the data fields within the records of the data source, and intercepting read requests from the program, substituting, utilizing the conversion routine, in a data item read from the data source, data having the desired format for data having the original format, intercepting write requests from the program, and substituting, utilizing the conversion routine, in a data item to be written to the data source, data having the original format for data having the desired format.

There is also provided in accordance with a preferred embodiment of the present invention a method of providing a program with virtual 4-digit year format date information derived from 2-digit year format stored in a data file, the method utilizing a data conversion definition created by a user containing all record types in the data file, fields in the record type used to identify the record type, including their values, and date fields and their corresponding format, the date fields corresponding to date information to be virtualized by the method, the method including the steps of generating a conversion routine, utilizing the data conversion definition, the conversion routine containing displacements and offsets of the date fields within the records of the data file, and intercepting input/output (I/O) read requests from the program, substituting, utilizing the conversion routine, in a record read from the data file, 4-digit year format information for 2-digit year format information, intercepting I/O write requests from the program, and substituting, utilizing the conversion routine, in a record to be written to the data file, 2-digit year format information for 4-digit year format information.

BRIEF DESCRIPTION OF THE DRAWINGS

The invention is herein described, by way of example only, with reference to the accompanying drawings, wherein:

FIG. 1 is a prior art illustration of a sample scenario involving multiple application programs accessing multiple data files;

FIG. 2 is a high level block diagram illustrating the application of the data adapter of the present invention to a sample data processing scenario;

FIG. 11 is the contents of a sample data conversion definition used in conjunction with the conversion routine generator;

DETAILED DESCRIPTION OF THE INVENTION

A high level block diagram illustrating the application of a data adapter, generally referenced 10, of the present invention to a sample data processing scenario is shown in FIG. 2. For purposes of teaching the principles of the present invention, an example of the year 2000 date problem discussed above is used throughout this disclosure. The illustration of the present invention using the year 2000 problem in no way limits the suitability of the present invention to other non date related applications. In particular, the present invention can be applied to any system where it is desired to virtually change the formatting of arbitrary data fields in a data source such as a data file, computer screen memory, magnetic tape, etc.

In connection with the year 2000 date problem and with reference to FIG. 2, Program A 28 represents an unconverted program and Program B 30 represents a program that has been converted. The term converted refers to the process of changing data from one type of format to another type of format. In the year 2000 problem example, the term converted refers to the process of changing every 2-digit year reference in the original program file to 4-digit year format. This includes any reference to dates, comparison of dates, arithmetic operations on one or more dates, etc. Unconverted data file 32 is the original date file that still retains the original 2-digit year format. Data adapter 10 functions to intercept all I/O calls from Program B and perform a virtual change of data format. In this example, all 2-digit year dates obtained from unconverted data file 32 are replaced with 4-digit year format dates. Thus, the fact that data adapter 10 is intercepting all I/O calls is transparent to Program B. It expects and receives 4-digit year formatted information. Likewise, when writing, data adapter 10 converts the 4-digit year format into 2-digit year format before actually writing the date data to the data file. Data adapter 10, thus allows both unconverted programs that still expect 2-digit year format data to execute side by side with programs already converted to handle 4-digit format year data.

An advantage of using data adapter 10 to virtualize data having an old format to data having a new desired format (e.g., converting 2-digit date to and from 4-digit dates by intercepting or filtering all I/O requests) is that it permits Management Information System (MIS) personnel, or anybody else responsible for handling data formatting changes, to convert application programs at their own pace. It is no longer necessary now to simultaneously place into production all programs and data files at once. Conversion projects may proceed at any desired pace since both converted and unconverted programs can exist simultaneously. For data files to be converted, however, all program files that access that particular data file must have been previously converted.

Figure 3:
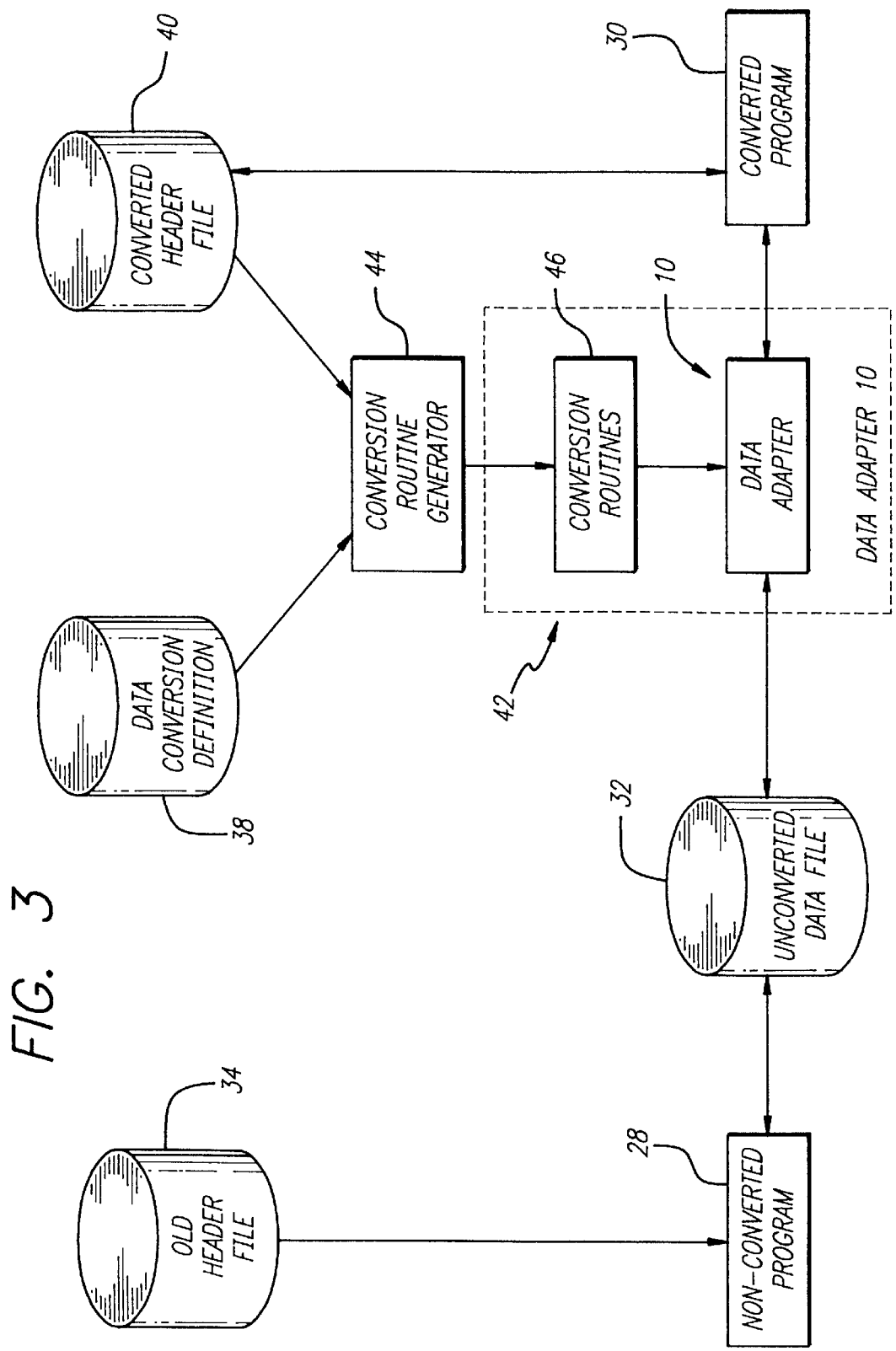
FIG. 3 is a high level block diagram illustrating the data adapter system of the present invention applied to a sample data processing scenario.

Referring to FIG. 3, data adapter 10 cooperates with one or more conversion routines 46 which define the desired transformation. Data adapter 10 and conversion routines 46 are collectively referred to as data adapter system. 42. In systems where flexibility is desirable to facilitate conversion of a variety of file formats, data adapter system 42 suitably cooperates with a conversion routine generator 44, employed to generate one or more conversion routines 46 from one or more data conversion definitions (rules) 38 and indicia of a converted header, e.g., a converted header file 40, provided by the user. A data conversion definition (rule) 38 is provided for each data item format to be converted. Conversion routines 46, in turn, are used by data adapter 10 to convert selected data items (e.g. date data) to and from first, e.g. 2-digit year and second, e.g. 4-digit year, formats. A data conversion definition 38 and a converted header file 40 are input to conversion routine generator 44. Indicia of a header corresponding to the original, unconverted date, e.g., an old header file 34 is input to non-converted program 28 which accesses an unconverted data file 32. Data adapter 10 accesses unconverted data file 32 in addition to receiving I/O requests from a converted program 30. Converted header file 40 also is used together with the converted program as input to the compiler.

In a preferred embodiment, data adapter 10 utilizes one or more conversion routines 46 in performing the actual conversions of data to and from unconverted data file 32. The conversion routines may be externally generated by conversion routine generator 44, described in more detail below, from data conversion definition(s) 38, and converted header file 40. Converted header file 40 defines the data structure after designated data items are transformed from the first to second format, e.g., contains all the data conversion declarations of the original program with date related data expanded to 4-digit year format. Data conversion definition 38 suitably contains explicit definitions, e.g., position, type, etc., of date related data contained in the converted header file.

Alternatively, data adapter system 42 may include an internal (integral) conversion routine generator, or a built in (e.g. hard-coded) conversion routine suitable for the type of data to be converted. Use of a hard-coded conversion routine, created either manually or by other automated means, is of particular utility in instances where the different data types and formats involved in an application are relatively few in number, and unchanging.

Both converted and non-converted programs may operate side-by-side upon the same unconverted data file 32. Non-converted program 28, using the first, e.g., 2-digit year date format, accesses unconverted data file 32 as normal. Converted program 48, however, has been converted to handle the second format, e.g., 4-digit year formatted date information. Data adapter 10, using conversion routines 46, effectively performs a conversion from first format to second format as part of each read operation, and a conversion from second format to first format as part of each write operation involving the designated data item, e.g., performs 2-digit to 4-digit conversions on date file reads and 4-digit to 2-digit conversions on date file writes.

FIGS. 4 through 13 and the accompanying descriptions assume the language and architecture of IBM mainframes and the COBOL programming language using sequential files. However, other platforms, databases and programming languages can easily be adapted in place of what is disclosed by one skilled in the art.

Figure 4:
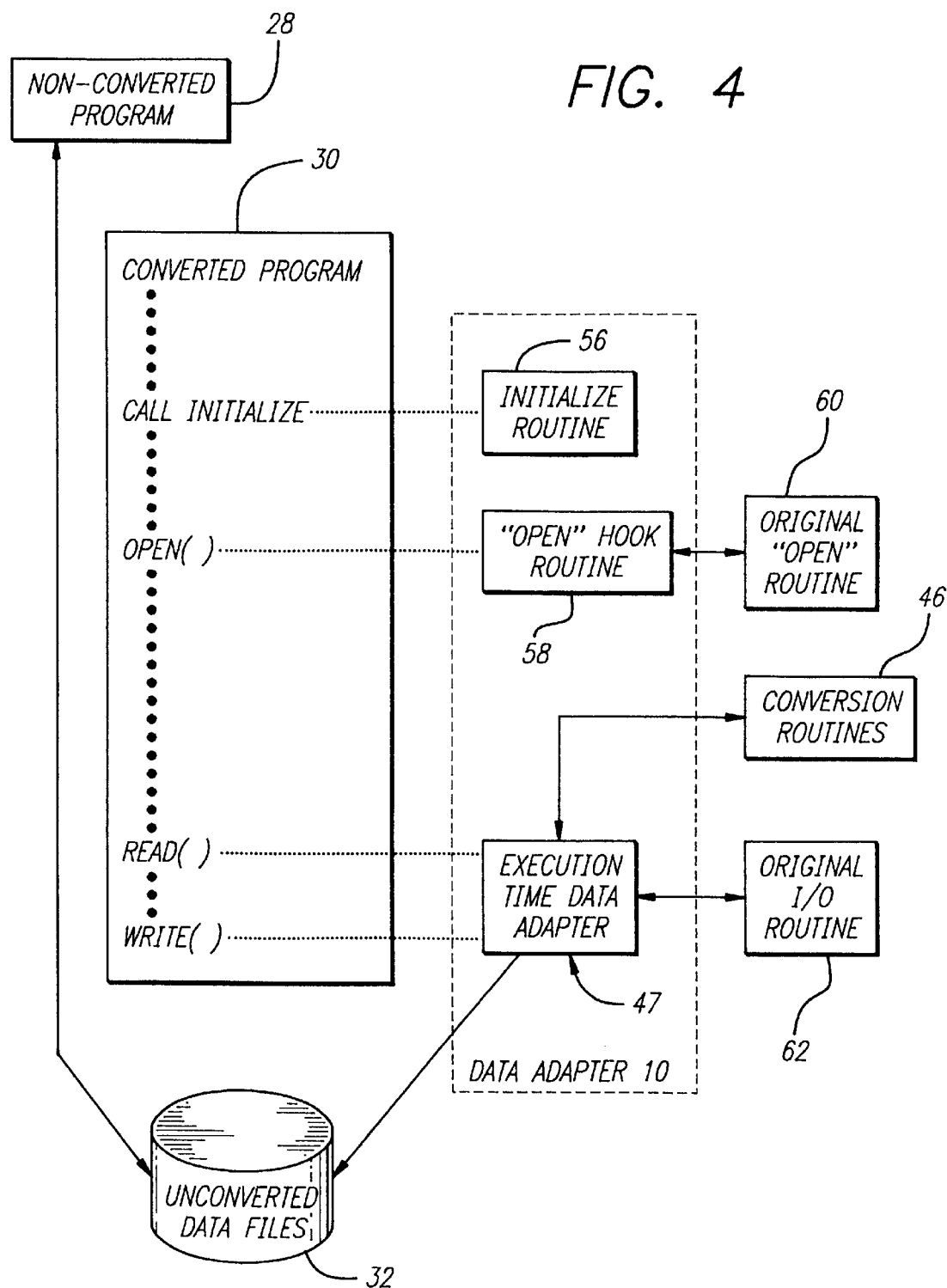
FIG. 4 is a high level block diagram illustrating in more detail the data adapter system of the present invention.

Referring to FIG. 4, a suitable data adapter 10 comprises an execution-time data adapter 47, conversion routines 46, an 'OPEN' hook routine 58 and an initialize routine 56. Converted program 30 comprises a sequence of instructions/statements in which all references to the designated data items have been converted from the first to the second format, e.g., all data references in converted program 30 have previously been converted from 2-digit to 4-digit year formats. FIG. 4 illustrates the typical sequence of COBOL statements used in a converted program that has been updated to handle the second, e.g., 4-digit year, format data.

In a preferred embodiment, converted program 30 triggers data adapter 10 through a single call to initialization routine 56, added at the beginning of the application program.

No other change to the program or the program's job control language (JCL) is required to launch the data adapter. Once flagged, the data adapter interprets all I/O operations on converted data files and activates the conversion routines. The use of conversion logic external to converted program 30, invoked by a single call, tends to simplify the programming that would otherwise be required to permit converted program 30 to accommodate unconverted data.

The call to initialization routine 56 identifies the files that are to be converted and associates those files with corresponding conversion routines 46. Once flagged, the data adapter interprets all I/O operations on converted data files and activates the conversion routines. The parameters of the call include pairs of file names. The first file name is the name of the data file that is to be handled and the second is the name of the conversion routine 56 associated with the data file specified in the first file name. More than one [data file, conversion routine] pair may be listed in the call to the initialize routine 56.

Initialize routine 56 in adapter 10 functions to set up hooking or trapping 'OPEN' command or statement. When an 'OPEN' command is encountered, 'OPEN' hook routine 58 is executed. The OPEN hook routine, described in more detail below, functions to set up additional hooking for I/O reads and writes and then calls the original 'OPEN' routine.

When a read or write statement is reached, in the converted program 30, program control is switched to data adapter 10. The data adapter utilizes conversion routines 46 in converting or virtualizing data having the original format to data having the desired new format. In particular, in the year 2000 example, 2-digit year data is converted to and from 4-digit year data. The data adapter also calls an original I/O routine 62 to actually perform the read or the write to unconverted data file 64. Thus, the data is virtualized and the application program is unaware that the data originally had the old formatting.

Co-existing simultaneously with converted program 30, non-converted program 52 suitably directly accesses 2-digit year information from unconverted data file 64.

Figure 5:
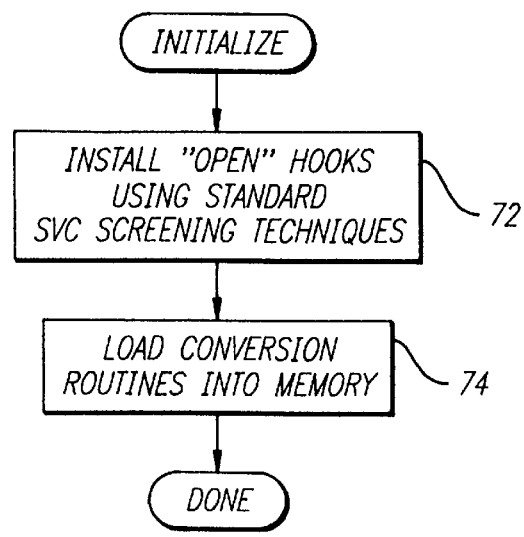
FIG. 5 is a high level flow diagram illustrating the initialize routine of the present invention.
Figure 13:
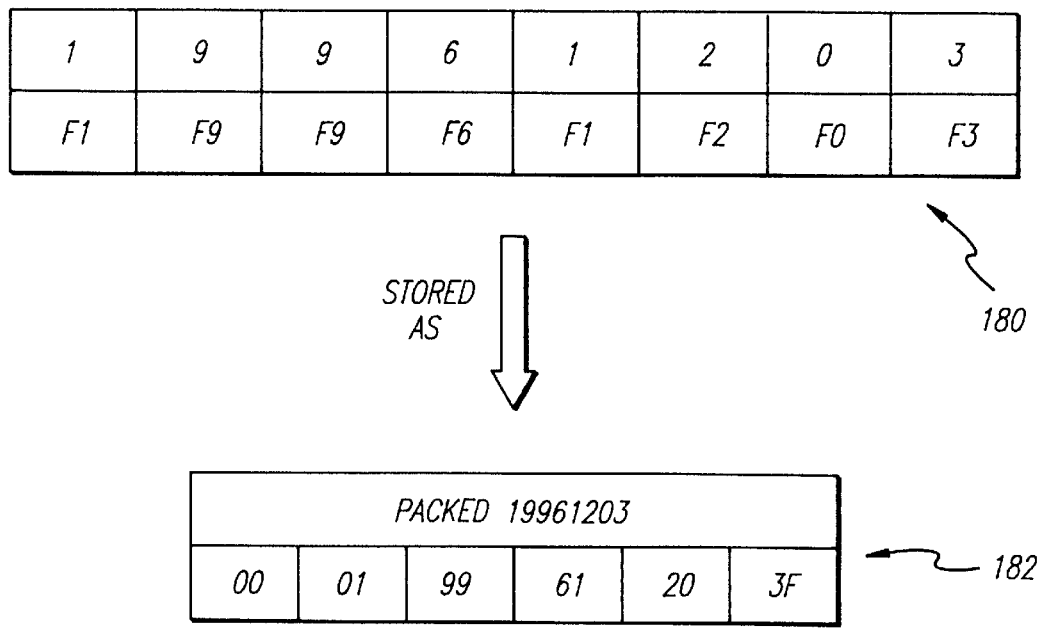
FIG. 13 is a data diagram illustrating the 8-byte representation of 4-digit year format data encoded and compressed into the original 6-byte 2-digit year format.

Referring now to FIG. 5, when a call to initialize routine 56 is made, the first step performed is to install hooks or software trapping using SVC screening techniques, well known to those skilled in the art (step 72). Next, the conversion routines are loaded into memory for speedy access (step 74).

Figure 6:
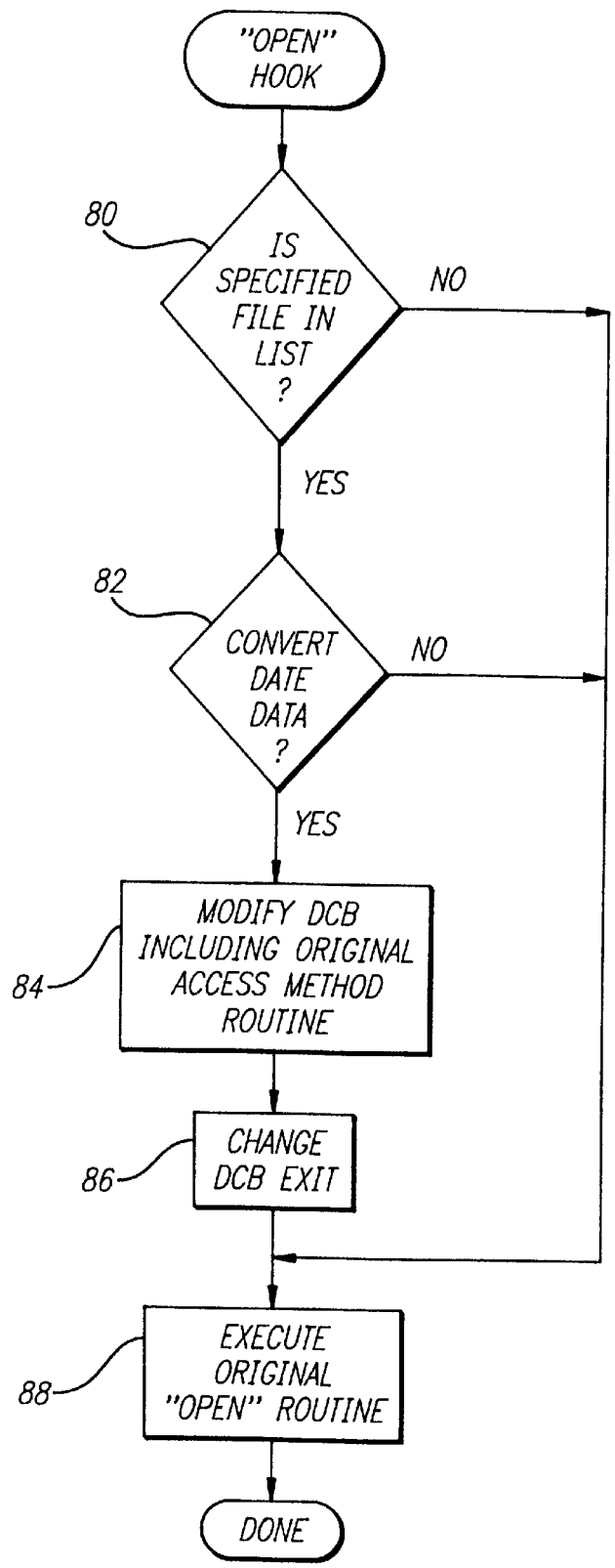
FIG. 6 is a high level flow diagram illustrating the 'OPEN' hook routine of the present invention.

Referring now to FIG. 6 when, as the converted program executes, an 'OPEN' command is eventually reached, program control is passed to hooked 'OPEN' routine. As described previously, hooking is one of the functions performed by initialize routine 56. In order to start converting data information from the file, a determination is made as to whether the data file included as a parameter in the OPEN statement is one of the data files listed in the call to the initialize routine (step 80). If the file is not one of the files in the set of parameters to the call statement, control is passed to original OPEN routine 60. If the file is on the call statement list, it is then determined whether the data file is to have its, e.g., date year information converted (step 82), suitably by reference to an indication of whether to convert a data file is made in the data conversion definition 38 (FIG. 3).

Even after date year information in a data file associated with a converted program is converted from a first to a second format, e.g., 2-digit to 4-digit year format, it may still be desirable to retain the associated statements (i.e., CALL initialize, OPEN, etc.) in the converted programs. Removing these statements, initially needed to set up the year information, requires additional testing and maintenance time, and there will likely be hundreds of such converted programs that do not need this extra code because all their associated data fields have already been converted to 4-digit year format. However, although current working date fields have been converted to 4-digit year format, it is very likely that historical data will not be converted. Many data processing shops may find that the sheer number of historical data files is too voluminous to attempt full conversions. Thus, the slight additional code to trigger the mechanisms of adapter 10 is likely to remain in converted programs and a mechanism is needed to know whether to convert a given data file or not. As described in more detail below, once a data file is converted it is a simple matter to indicate this fact in the data conversion definition 38.

In the exemplary context of a COBOL system, once it is determined that a given data file is to be converted, the next step is to modify the Data Control Blocks (DCBs) that were provided by the application program to accommodate those attribute(s) such as record length, where the actual presentation and virtual presentation may differ. In addition, I/O routine hooking is installed by modifying the access method routine in the corresponding DCB (step 84). The DCB exit is also modified in order to properly install I/O routine hooking (step 86). Once I/O hooking is in place, the original OPEN routine 60 is executed (step 88).

Figure 7:
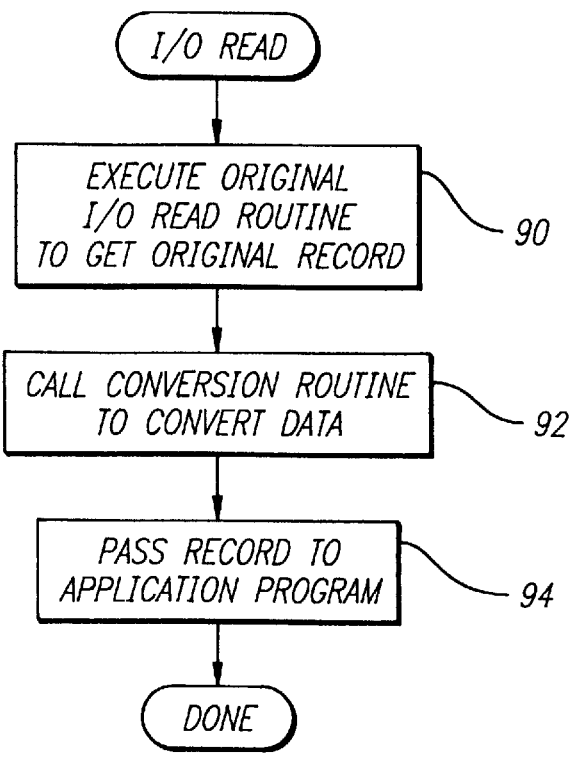
FIG. 7 is a high level flow diagram illustrating the Input/Output (I/O) read routine of the present invention.
Figure 8:
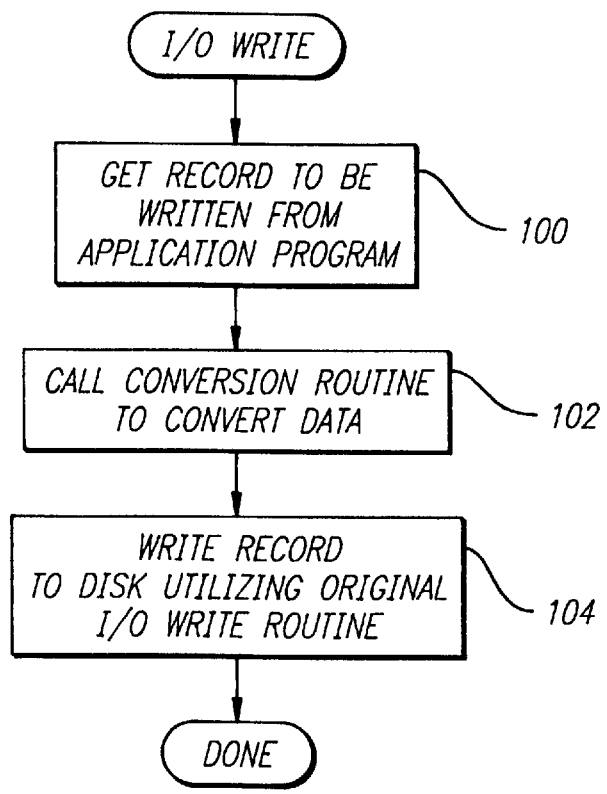
FIG. 8 is a high level flow diagram illustrating the I/O write routine of the present invention.

Execution-time data adapter 47 will now be described in more detail. Data adapter 10 comprises an I/O read process (FIG. 7) and an I/O write process (FIG. 8). Referring now to FIGS. 4 and 7, when a read statement/command is encountered in converted program 30, the original I/O read routine 62 (FIG. 4) is initially executed. Next, the conversion routine 46, generated previously, corresponding to the data file, is called to perform the actual first format to second format, e.g., 2-digit to 4-digit year format, conversion (step 92). The converted, e.g., 4-digit year, format data is passed to the calling converted application program 30 (step 94).

Referring now to FIGS. 4 and 8, when a write statement/command is encountered in converted program 30, the record to be written to the data file is passed to the hooked I/O write routine of FIG. 8 (step 100). The data file's corresponding conversion routine 46 is called to perform the actual second format to first format, e.g., 4-digit to 2-digit, conversion on the record (step 102). Once converted, the original I/O routine 62 (FIG. 4) writes the record to the data file 32. Thus, the I/O read and write routines of the present invention permit the data file 32, which retains its original, e.g., 2-digit year, format data, to be virtually converted to the second, e.g., 4-digit year, format.

As previously noted, conversion routines 46, may be hard-coded or generated by an internal (integral) conversion routine generator. However, in instances where a number of different data types and formats are involved in an application, e.g., the application operates upon data having a number of different record formats, conversion routines 46 are preferably generated by conversion routine generator 44 (FIG. 3) external to adapter 10, to maximize flexibility. From a user's perspective, use of conversion routine generator 44 greatly simplifies the task of defining lengths and offsets of the data fields within a data file that need to be converted; a user is able to specify lengths and offsets in the language of the application, e.g., COBOL, rather than in a more cryptic type fashion.

Figure 9:
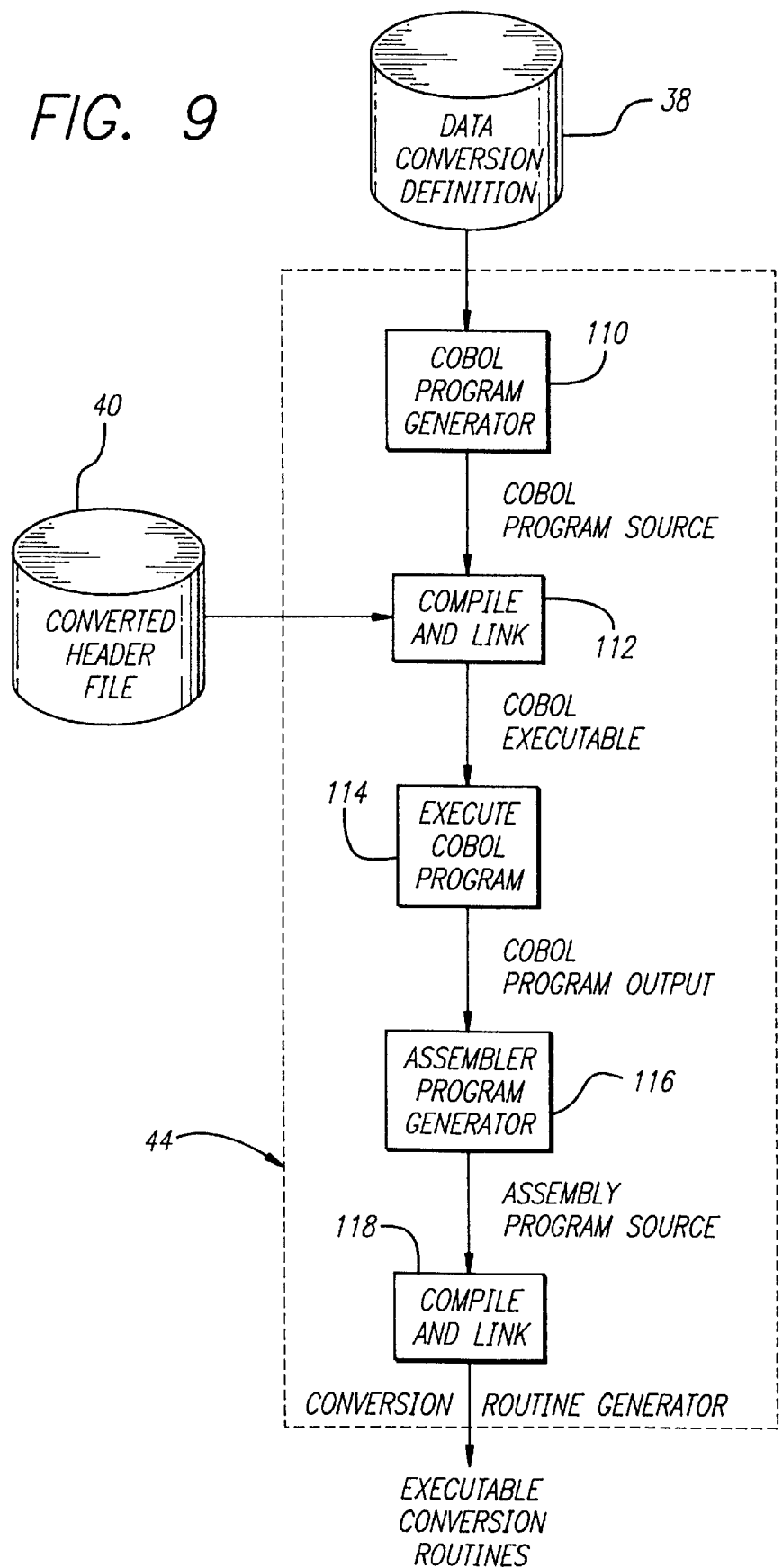
FIG. 9 is a high level block diagram illustrating in more detail the conversion routing generator of the present invention.

With reference to FIGS. 3 and 9, conversion routine generator 44 will now be described in more detail. With reference to FIG. 3, data conversion definition 38 (e.g. a data definition file) and converted header file 40 are provided as inputs to conversion routine generator 44. Converted header file 40 is the original header file modified in accordance with the second format, e.g. with expanded date field sizes (2-digit year fields have been expanded to 4-digit year fields). Indicia of data conversion definition 38 is input to a suitable program generator (step 110). The programming language COBOL is suitably used in the exemplary embodiment here described. However, other programming languages would work just as well. One skilled in the art could substitute other programming languages and other platforms to perform the teachings of the present invention.

The function of the program generator 110 is to generate a program (e.g. in COBOL) that can be used to determine for all the data fields in the data file, the lengths and byte offsets used in the conversion routine, and whether or not they are to be converted or not (e.g., to 4-digit year data).

The COBOL program source output from the COBOL program generator is compiled and linked (step 112) using a standard COBOL compiler and linker. The converted header file 40 is used as input during the step of compiling and linking. The converted header file 40 provides all the data file data definitions (i.e., structures, arrays, variables, etc.) needed by the COBOL program to access the data file. The output object code is then executed (step 114).

The executed program preferably uses a novel technique to determine the offsets, displacements, size and type of the data field and other variables within the data file. The technique involves filling a record with hex FF in every byte. Data are then selectively written to the record. The record is then scanned and the position and length of the non-FF data is determined. The non-FF data corresponds to the data fields within the record. This technique is performed by assembler routines invoked by the COBOL program.

The binary length and offset and (displacement), output of the COBOL program is input to an assembler program generator (step 116). The assembly program generator uses the output of the COBOL program to generate the source code for the conversion routines. The assembly source code is then compiled (i.e., assembled) and linked using standard development tools (step 118). The object code output from the conversion routine generator is the executable conversion routine.

Figure 10:
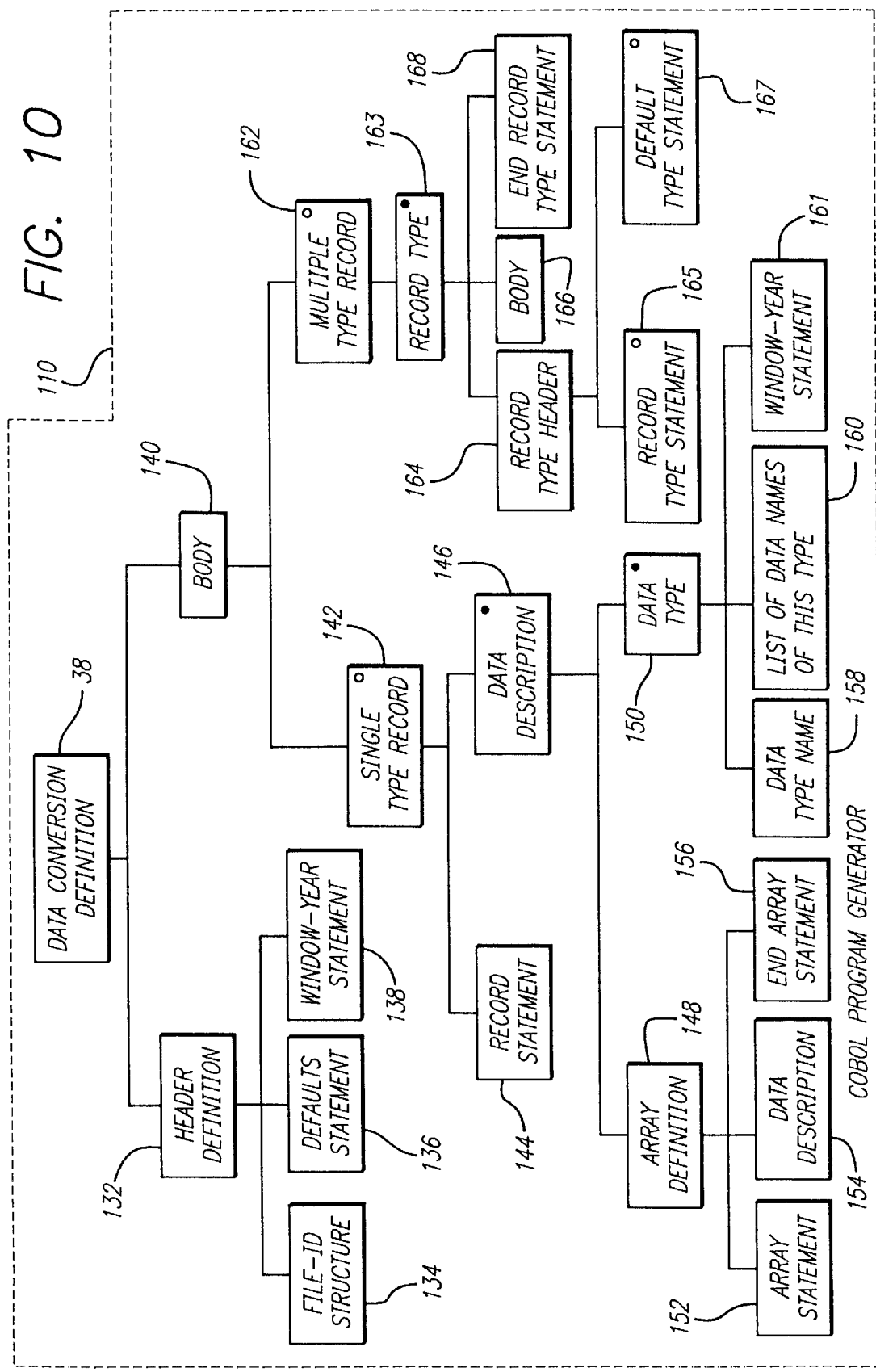
FIG. 10 is a high level block diagram illustrating in more detail the COBOL program generator of the present invention.

The COBOL program generator will now be described in more detail. A high level block diagram illustrating the syntax structure used by the COBOL program generator is shown in FIG. 10. Once the syntax structure is defined, it is a straightforward process to one skilled in the art to generate corresponding COBOL source code. A one to one relationship exists between the syntax structure illustrated in FIG. 10 and the COBOL generator source code.

Data files sometimes include records with different formats, or records with varying information. Data conversion definitions 38 include the information necessary to identify the various types of records, as well as the particular logic to be employed in the conversion. Data conversion definition 38 suitably includes a header definition 132 followed by a body 140.

Header definition 132 suitably includes a FILE-ID structure 134, a default statement 136 and a conversion protocol 138. In the exemplary context of year 2000 application, conversion protocol 138 suitably comprises a window-year protocol statement defining the lowest date assumed to be in the $20^{th}$ century; all earlier dates (lower numbers) are assumed to be in the $21^{st}$ century.

The body 140 of a data conversion definition 38, can be either a single type record definition 142 or a multiple type record definition 162. A single type record 142 suitably includes a record statement 144 followed by a data description 146. The data description 146 can be an array definition 148 or it can be one or more data type definitions 150 (indicated by the star '*' symbol). An array definition 148 suitably includes an array statement 152, a recursive data description 154 and an end array statement 156. A data type definition 150 suitably begins with a data item, date, type name (of the format YYMMDD, for example) followed by a list of data names of this type 160. If desired, conversion protocols different from the protocol specified in statement 138 of the header definition 132 can be utilized for different data item types. In such case, a data type protocol statement 161, e.g., window-year protocol, may be provided as part of the data type definition.

A multiple type record definition 162 suitably includes one or more record type statements 163 (indicated by the star '*' symbol). Each record type statement 163 suitably includes a record header statement 164, recursive body 166 and end record type statement 168. A record type header 164 suitably includes either a record type statement 165 or a default type statement 167. A multiple type record 162 may have many record type statements and one default type statement as the last record type header for this multiple type record.

An example of a data conversion definition used as input to the conversion routine generator is illustrated in FIG. 11. The initial step in applying the data adapter entails defining the data fields. For each data file all the record types in the data file must be defined. In addition, the fields in the record that are used to identify the record type, and their corresponding values—per record type are defined. The data fields and their format—per record type must also be defined. These definitions are passed to the data adapter in a special syntax that accepts the same variable names used by the organization's programming language, such as COBOL.

With reference to FIGS. 10 and 11, the FILE-ID 134 'BANKIN' is used as the reference to the data file and its generated conversion routines. The default statements 136, under 'DEFAULTS,' are to convert the data file and use old output formatting. The window-year statement 138 indicates a 20 year window, meaning dates 00 to 20 are translated to 2000 to 2020 and dates 21 to 99 are translated to 1921 through 1999. The 'COPY BANKIN' statement functions to include the contents of the copy book or header file associated with the 'BANKIN' data file. The record type statement 164 'BK-RECORD-TYPE' follows the record definition section. The next four TYPE statements 142 describe various date fields in the 'BANKIN' data file. The last section is a DEFAULT-TYPE statement for the case when the data field does not fit any of the previous type statements.

The advantage of using this technique to define the date fields is that the definitions are simple and easily understood. In addition, the programming language data names are used to specify the date fields, making it unnecessary for the user to manually calculate the field's position, thus saving time and eliminating errors. In addition, the converted system is 'live' in that changes can be made to the record definitions at any time. To have the data adapter use these changes only the data conversion definition needs to be recompiled and the changes will automatically be reflected in the conversion routines rebuilt by the conversion routine generator.

Figure 12:
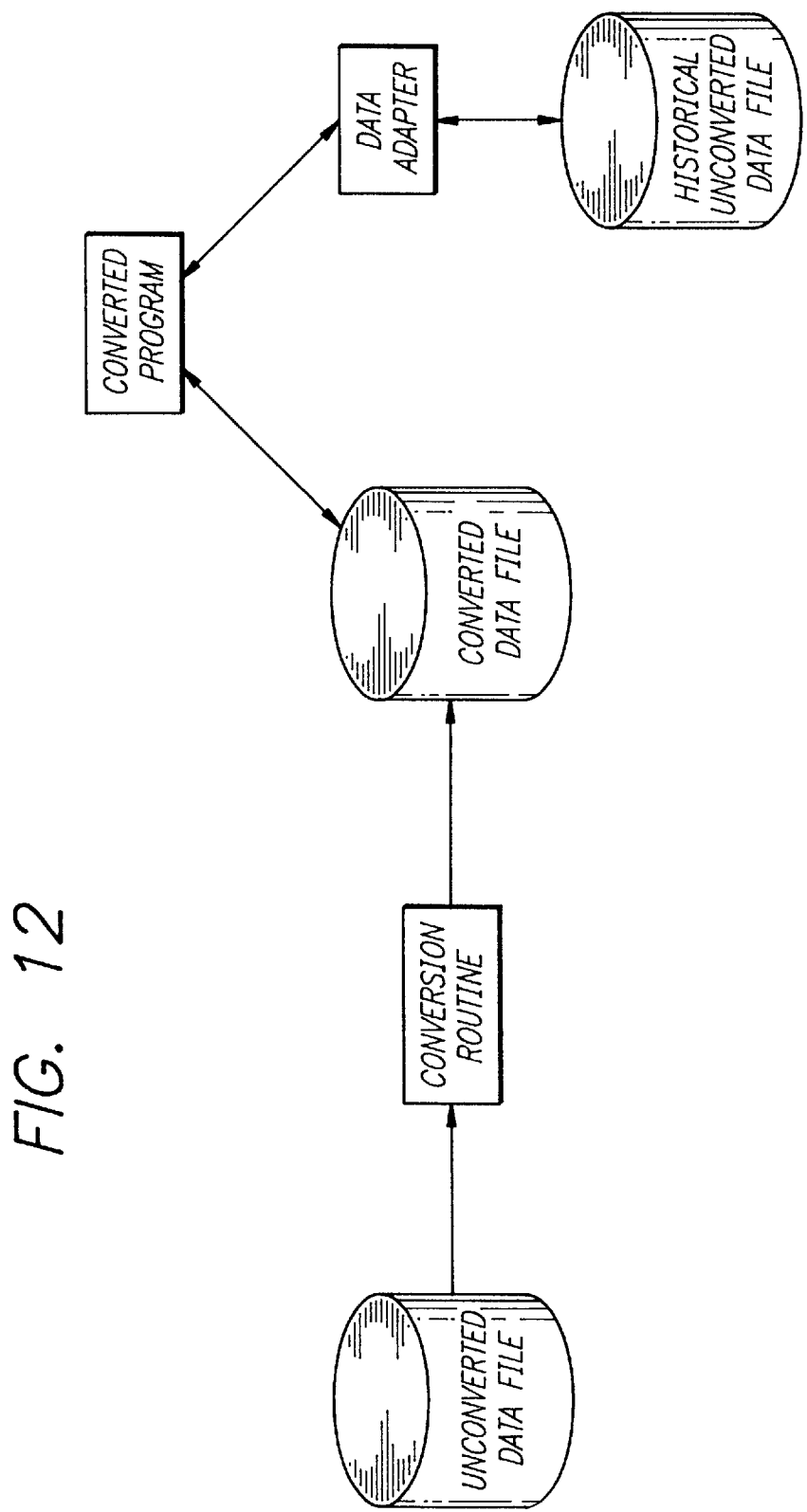
FIG. 12 is high level block diagram illustrating the data adapter system of the present invention as applied to the conversion of data files to 4-digit year format.

Even after both the program and data file have been converted, it is often desirable to retain the conversion ability, to, for example, access historical (e.g., archived) files. Referring to FIG. 12 in a typical data processing scenario a conversion routine 46 has been previously generated by the conversion routine generator 44 and employed to convert all the records in an unconverted data file 170, e.g., having 2-digit year format data, into a converted data file 172 at one time.

Once converted, unconverted data file 170 is no longer needed, since no other programs need access to it. Once converted, converted program 174 directly accesses data file 172 without the necessity of data adapter 10. The conversion process can be disabled by changing the DEFAULTS statement in the data conversion definition to 'CONVERT NO.' Making this change will prevent the data adapter from operating on the data file, and the programs, without any need for recompilation, will receive the records directly from the file. If the programs need to be run using historical or backup files 176 that were not converted, the data adapter can be triggered for a specific run by adding a control statement to the job control language (JCL).

In an alternative embodiment, the data adapter can selectively convert the data files containing records with both first and second formats. For example, it may be desirable that a program have the capacity to operate upon both converted and non-converted data, such as in an instance where data is converted on-the-fly, as accessed in normal operation. In the context of a year 2000 application such a file might have two types of records: records having dates in the original 2-digit year format; and records with expanded 4-digit year format but which are stored in place of the old date, leaving the record length unchanged. The expanded date information is suitably stored as a 6-byte (1 digits) packed decimal number. A data diagram illustrating the 8-byte representation of 4-digit year format data encoded and compressed into a packed 6 byte format is shown is FIG. 13. Date field 180 is the 2-digit year format of the original unconverted data. Data field 182 is correspondingly converted 4-digit year data, as expected by the program stored in packed format in the same length (6 byte) field as the original data field. Thus, the field length and record length of the data file remains unchanged. The data file contains a mixture of both year formats. The data adapter uses the internal representation of these two types to distinguish between them. The program always receives expanded 4-digit year format data as the method in which the dates are stored is transparent to it. Alternatively, all of the records in data file 32 may be converted at one time, as described above, and the conversion feature activated only when unconverted data must be accessed.

While the invention has been described with respect to a limited number of embodiments, it will be appreciated that many variations, modifications and other applications of the invention may be made.

What is claimed is:

1. A data adapting system for virtualizing an arbitrary item of data derived from a data source, having an original format, so as to be presented in a desired format to a program, said system utilizing a data conversion definition, said data conversion definition containing for each record type in said data source including said data item, indicia of fields in said record type used to identify said record type, including the values of the fields, and data fields and their corresponding format, at least one of said data fields corresponding to the data item to be virtualized, said system comprising:

A) a data conversion routine generator operative to generate at least one data conversion routine utilizing said data conversion definition;

B) said at least one data conversion routine mapping the data fields within said records of said data source to the desired format in accordance with the data conversion definition; and C) code inserted in said program to invoke a data adapter hook routine, which data adapter hook routine, when initialized, is operative to:

1) intercept read requests from said program and, utilizing said at least one data conversion routine, substitute in a data item read from said data source, data having said desired format for data having said original; and 2) intercept write requests from said program and, utilizing said at least one data conversion routine, substitute in a data item written to said data source, data having said original format for data having said desired format.

2. The system according to claim 1, wherein said original data format is a 2-digit year format and said desired data format is a 4-digit year format.

3. The system according to claim 1, wherein said data source comprises a data file.

4. The system according to claim 1, wherein said data source comprises computer screen memory.

5. The system of claim 1 in which:
the conversion routine generator is operative to generate a plurality of conversion routines in accordance with the data conversion definition.

6. The system of claim 1, wherein the data conversion routine includes indicia of field lengths and offsets for converting data form the original to the desired format.

7. The system of claim 1, wherein said original data format is a first date format and said desired data format is a second date format.

8. The system of claim 7, wherein one of the date formats is a 2-digit year format and the other date format is a 4-digit year format.

9. The system of claim 7, wherein one of the date formats is a 2-digit year format and the other date format is a 4-digit year packed decimal format.

10. The system of claim 1, wherein said data conversion definition comprises a header and a body; said header including indicia of file structure, and said body comprising indicia of record type, and indicia of data fields in said record type to be modified by said data conversion routine.

11. The system of claim 10 wherein said header further includes indicia of a conversion protocol.

12. The system of claim 11 wherein said body further includes, for at least one of data fields to be modified by said data conversion routine, indicia of a conversion protocol.

13. The system of claim 10 wherein said body further includes, for at least one of said data fields to be modified by said data conversion routine, indicia of a conversion protocol.

14. The system of claim 1, wherein the data conversion routine includes indicia of field lengths and offsets for converting data from the original to the desired format.

15. A data adapting system for providing a program with date information in a virtual second date format derived from data in a first date format stored in a data source, said system utilizing at least one data conversion definition containing indicia of record types in said data source, fields in said record type used to identify said record type and the relevant values of the identifying fields, and date fields and their corresponding format, said date fields corresponding to date information to be virtualized by said system, said system comprising:
A) a data conversion routine generator operative to generate at least one data conversion routine utilizing said data conversion definition;
B) said at least one data conversion routine mapping the data fields within said records of said data source to the second format in accordance with the data conversion definition; and
C) code inserted in said program to invoke a data adapter hook routine, which data adapter hook routine, when initialized, is operative to:
1) intercept read requests from said program and, utilizing said at least one data conversion routine, substituting in a record read from said data source, information in the second date format for information in the first date format, and
2) intercept write requests from said program and, utilizing said at least one data conversion routine, substituting in a record written to said data source, information in the first date format for information in the second date format.

16. The system according to claim 15, wherein the conversion routine generator employs:
A) a first program generator utilizing the data conversion definition to generate a mapping routine operative to determine the mapping of the date fields in the data source into the second format; and
B) a second program generator to process the output of the mapping routine to generate the at least one conversion routine.

17. The system of claim 15, wherein one of the date formats is a 2-digit year format and the other is a date format 4-digit year format.

18. The system of claim 15, wherein one of the date formats is a 2-digit year format and the other is a date format 4-digit year packed decimal format.

19. A method of virtualizing an arbitrary item of data, having a first format, contained in a data source, so as to be presented in a second format, the method utilizing a data conversion definition, the data conversion definition containing indicia of record types in the data source, fields in the record type used to identify the record type and the relevant values thereof, and data fields and the corresponding format thereof, the data fields corresponding to the data to be virtualized, the method comprising the steps of:
A) generating a conversion routine for mapping the first format data fields within the records of the data source to the second format in accordance with the data conversion definition;
B) inserting code into the program adapted to invoke a data adapter hook routine;
C) using the data adapter hook routine to intercept read requests from the program;
D) substituting, utilizing the conversion routine, in a data item read from the data source, data having the second format for data having the first format;
E) using the data adapter hook routine to intercept write requests from the program; and
F) substituting, utilizing the conversion routine, in a data item to be written to the data source, data having the first format for data having the second format.

20. The method of claim 19, wherein one of the data formats is a 2-digit year format and the other data format is a 4-digit year format.

21. The method of claim 19, wherein the conversion routine generator generates a plurality of conversion routines in accordance with the data conversion definition.

22. The method of claim 19, wherein the data conversion routine includes indicia of field lengths and offsets for converting data from the original to the desired format.

23. The method of claim 19, wherein said the data format is a first date format and the second data format is a second date format.

24. The method of claim 23, wherein one of the date formats is a 2-digit year format and the other date format is a 4-digit year packed decimal format.

25. The method of claim 19, wherein the data source comprises a data file.

26. The method of claim 19, wherein the data source comprises computer screen memory.

27. The method of claim 19, wherein the step of generating the conversion routine includes the steps of:
A) utilizing the data conversion definition to generate a high level program, which high level program is operative to determine the mapping of the date fields in the data source into the second format; and
B) processing the results of the high level program to generate the conversion routine.

28. The method of claim 19, wherein the data conversion definition further comprises, for at least one of the data fields to be modified, indicia of a conversion protocol.

29. The system of claim 19, wherein one of the data formats is a 2-digit year format and the other data format is a 4-digit year packed decimal format.

30. A system for transforming data from a data source having a first format into data having a second format for use by a program, said system comprising:

(A) a data conversion definition;

(B) at least one data conversion routine for mapping the first format into the second format in accordance with said data conversion definition; and (C) code inserted in said program to invoke a data adapter hook routine, said data adapter hook routine, when initialized, being operative to:
1) intercept read requests from said program and, utilizing said at least one data conversion routine, substitute for data in said first format read from said data source, data having said second format, and
2) intercept write requests from said program and, utilizing said at least one data conversion routine, substitute in data written to said data source, data having said first format for data having said second format.

31. The system according to claim 30, wherein said first and second data formats are, respectively, first and second date formats and in which said conversion routine generator comprises:

A) a first program generator, said first program generator utilizing said data conversion definition to generate a first mapping routine, said first mapping routine operative to determine the mapping of date fields in said data source into the second format; and B) a second program generator, said second program generator processing output of said first preprocessing routine to generate said conversion routine.

32. The system of claim 30 wherein the data conversion definition comprises indicia of:

A) record types in said data source;

B) fields in said record type used to identify said record type and the relevant values of the identifying fields; and C) fields corresponding to data information to be virtualized by said system and the format corresponding thereto.

33. The system of claim 30, wherein the data conversion routine includes indicia of field lengths and offsets for converting data from the first format to the second format.

34. The system of claim 30, wherein said first format is a first date format and said second format is a second date format.

35. The system of claim 34, wherein one of the date formats is a 2-digit year format and the other is a 4-digit year format.

36. The system of claim 34, wherein one of the first and second date formats is a 2-digit year format and the other of the first and second date formats is a 4-digit year packed decimal format.

37. The system according to claim 30, wherein said data source comprises a data file.

38. The system according to claim 30, wherein said data source comprises computer screen memory.

39. The system of claim 30 wherein the data conversion definition comprises indicia of:

A) record types in said data source;

B) fields in said record type used to identify said record type and the relevant values of the identifying fields; and C) fields corresponding to data information to be virtualized by said system and the format corresponding thereto.

* * * * *